United States Patent
Yang et al.

(10) Patent No.: US 8,605,258 B2
(45) Date of Patent: Dec. 10, 2013

(54) DISTANCE MEASURING DEVICE AND METHOD FOR MEASURING DISTANCE

(75) Inventors: Shu-Sian Yang, Hsinchu (TW);
Hsin-Chia Chen, Hsinchu (TW);
Ren-Hau Gu, Hsinchu (TW);
Sen-Huang Huang, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 548 days.

(21) Appl. No.: 12/888,735

(22) Filed: Sep. 23, 2010

(65) Prior Publication Data

US 2012/0013885 A1    Jan. 19, 2012

(30) Foreign Application Priority Data

Jul. 14, 2010 (TW) .................................. 99123159 A

(51) Int. Cl.
*G01C 3/08* (2006.01)
(52) U.S. Cl.
USPC .......... 356/4.01; 356/3.01; 356/4.1; 356/5.01
(58) Field of Classification Search
USPC ................. 356/3.01–5.15, 6–22, 28, 28.5
See application file for complete search history.

(56) References Cited

U.S. PATENT DOCUMENTS

| | | | |
|---|---|---|---|
| 5,151,608 A | | 9/1992 | Torii et al. |
| 7,474,256 B2 * | | 1/2009 | Ohta et al. ............... 342/146 |
| 2004/0257556 A1 * | | 12/2004 | Samukawa et al. .......... 356/4.01 |
| 2005/0274890 A1 * | | 12/2005 | Anderton et al. ............. 250/334 |
| 2006/0274299 A1 | | 12/2006 | Matsuura et al. |
| 2011/0007299 A1 | | 1/2011 | Moench et al. |

FOREIGN PATENT DOCUMENTS

| | | | | |
|---|---|---|---|---|
| JP | 03282392 A | * | 12/1991 | ............. G01S 17/08 |
| JP | 2006038571 A | | 2/2006 | |
| JP | 2007107923 A | | 4/2007 | |
| TW | 200801839 A | | 1/2008 | |
| TW | 200928570 A | | 7/2009 | |
| TW | M384381 | | 7/2010 | |
| WO | 2009090593 A1 | | 7/2009 | |

* cited by examiner

*Primary Examiner* — Luke Ratcliffe
(74) *Attorney, Agent, or Firm* — WPAT, PC; Justin King

(57) ABSTRACT

A distance measuring device having a measuring range and configured for measuring a distance of at least an object located in the measuring range is provided. The distance measuring device includes a light emitting component, a diffusing component, an adjusting component and an image sensing component. The light emitting component is configured for emitting a light beam. The diffusing component is disposed on a transmission path of the light beam and is configured for transforming the light beam into a measuring light beam with a specific pattern to irradiate the object. The adjusting component is configured for adjusting an incidence angle and an incidence location of the light beam striking at the diffusing component. The image sensing component has a field of view covering the measuring range. The distance measuring device has a far measurable distance. A method for measuring distance and another distance measuring device are also provided.

24 Claims, 9 Drawing Sheets

| 22 | | | |
|---|---|---|---|
| 22(1,1) | 22(1,2) | ····· | 22(1,n) |
| 22(2,1) | 22(2,2) | ····· | 22(2,n) |
| ····· | ····· | ····· | ····· |
| 22(n,1) | 22(n,2) | ····· | 22(n,n) |

DISTANCE MEASURING DEVICE AND METHOD FOR MEASURING DISTANCE

BACKGROUND

1. Technical Field

The present invention relates to a distance measuring device, and particularly to an optically distance measuring device and a method for optically measuring distance.

2. Description of the Related Art

Recently, a three dimension distance measuring device has been widely applied to measurement of distance. The measuring principle of a conventional three dimension distance measuring device is described as follows. A laser emitter emits a specific measuring light beam. An image sensor senses the specific measuring light beam to obtain the optical information (e.g., time, position, configuration, size, intensity, phase, etc.) of the specific measuring light beam. According to the optical information, the distances of various objects in the measuring range of the conventional three dimension distance measuring device can be obtained.

A measurable distance of the conventional distance measuring device is usually changeless. However, in practical processes of applying the conventional distance measuring device, it is necessary to change the measurable distance of the distance measuring device according to the various applying environments. Therefore, the conventional distance measuring device can not satisfy the demand of changing the measurable distance.

On the other hand, when the conventional distance measuring device is used to measure a far object, the energy of the light beam irradiating the far object is poor. Thus, it is necessary for the conventional distance device to be equipped with a high power light emitting component so that the conventional distance device has a far measurable distance. However, equipping with the high power light emitting component will increase the cost of the conventional distance measuring device, and further will not benefit for saving energy resources and environmental protection.

BRIEF SUMMARY

The present invention provides a distance measuring device, which is capable of increasing a measurable distance on a condition that the power of a light emitting component is not increased.

The present invention provides a method for measuring distance, which is capable of increasing a measurable distance on a condition that the power of a light emitting component is not increased.

The present invention provides a distance measuring device, which has a changeable measurable distance.

To achieve at least one the above-mentioned advantages, the present invention provides a distance measuring device having a measuring range. The distance measuring device is configured for measuring a distance of at least an object located in the measuring range. The distance measuring device includes a light emitting component, a diffusing component, an adjusting component and an image sensing component. The light emitting component is configured for emitting a light beam. The diffusing component is disposed on a transmission path of the light beam and is configured for transforming the light beam into a measuring light beam with a specific pattern to irradiate the object. The adjusting component is configured for adjusting an incidence angle and an incidence location of the light beam striking at the diffusing component. The image sensing component has a field of view covering the measuring range.

In one embodiment provided by the present invention, the adjusting component includes a driving member. The driving member is connected to the light emitting component so as to rotate the light emitting component.

In one embodiment provided by the present invention, the driving member includes a motor or a microelectro mechanical systems (MEMS) device.

In one embodiment provided by the present invention, the adjusting component includes a reflecting member and a driving member. The reflecting member is disposed between the diffusing component and the light emitting component, and is configured for reflecting the light beam to the diffusing component. The driving member is connected to the reflecting member so as to rotate the reflecting member.

In one embodiment provided by the present invention, the distance measuring device further includes a focusing lens. The focusing lens is disposed between the light emitting component and the diffusing component and on the transmission path of the light beam.

In one embodiment provided by the present invention, the focusing lens is a zoom lens.

In one embodiment provided by the present invention, the distance measuring device further includes a movable member. The movable member is connected to the diffusing component and is configured for moving the diffusing component.

In one embodiment provided by the present invention, the light emitting component is a laser emitter or a light emitting diode (LED).

In one embodiment provided by the present invention, the diffusing component is selected from a group consisting of a diffuser, a diffraction component and a light uniforming sheet.

In one embodiment provided by the present invention, a first central axis of the measuring light beam is parallel to a second central axis of the field of view of the image sensing component.

In one embodiment provided by the present invention, an included angle is formed between a first central axis of the measuring light beam and a second central axis of the field of view of the image sensing component.

In one embodiment provided by the present invention, the distance measuring device further includes a beam splitter. The beam splitter is disposed between the diffusing component and the image sensing component.

In one embodiment provided by the present invention, a first central axis of a portion of the measuring light beam passing through the beam splitter and a second central axis of the field of view of the image sensing component turned by the beam splitter are parallel or overlapped.

To achieve at least one of the above-mentioned advantages, the present invention also provides a method for measuring distance. The method is suitable for the above distance measuring device and includes the following steps. At first, the measuring range is divided into a plurality of sensing regions. Next, the incidence angle and the incidence location of the light beam striking at the diffusing component are adjusted by the adjusting component to let the measuring light beam irradiate the sensing regions in sequence, and the optical information of the measuring light beam in each of the sensing regions is sensed by the image sensing component. Then, the distance of the object located in the measuring range is obtained according to the optical information.

To achieve at least one of the above-mentioned advantages, the present invention further provides a distance measuring device having a measuring range. The distance measuring device is configured for measuring a distance of at least an object located in the measuring range. The distance measuring device includes a light emitting component, a diffusing component, a focusing lens and an image sensing component. The light emitting component is configured for emitting a light beam. The diffusing component is disposed on a transmission path of the light beam and is configured for transforming the light beam into a measuring light beam with a specific pattern to irradiate the object. The focusing lens is disposed between the light emitting component and the diffusing component and on the transmission path of the light beam. At least one of a focal length of the focusing lens and a distance between the diffusing component and the focusing lens is changeable. The image sensing component has a field of view covering the measuring range.

In the distance measuring device and the method for measuring distance of embodiments of the present invention, the measuring range of the distance measuring device is divided into the plurality of sensing regions, and the incidence angle and the incidence location of the light beam striking at the diffusing component are adjusted by the adjusting component to let the measuring light beam irradiate the sensing regions in sequence, thereby obtaining the distance of the object located in the measuring range. Thus, the measurable distance of the distance measuring device can be increased on a condition that the power of the light emitting component is not increased. In addition, in the distance measuring device of another embodiment of the present invention, because at least one of the focal length of the focusing lens and the distance between the diffusing component and the focusing lens is changeable, the measurable distance of the distance measuring device is adjustable and changeable, thereby satisfying the demand of changing the measurable distance.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 3 is a schematic view of dividing a measuring range in accordance with an embodiment of the present invention.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
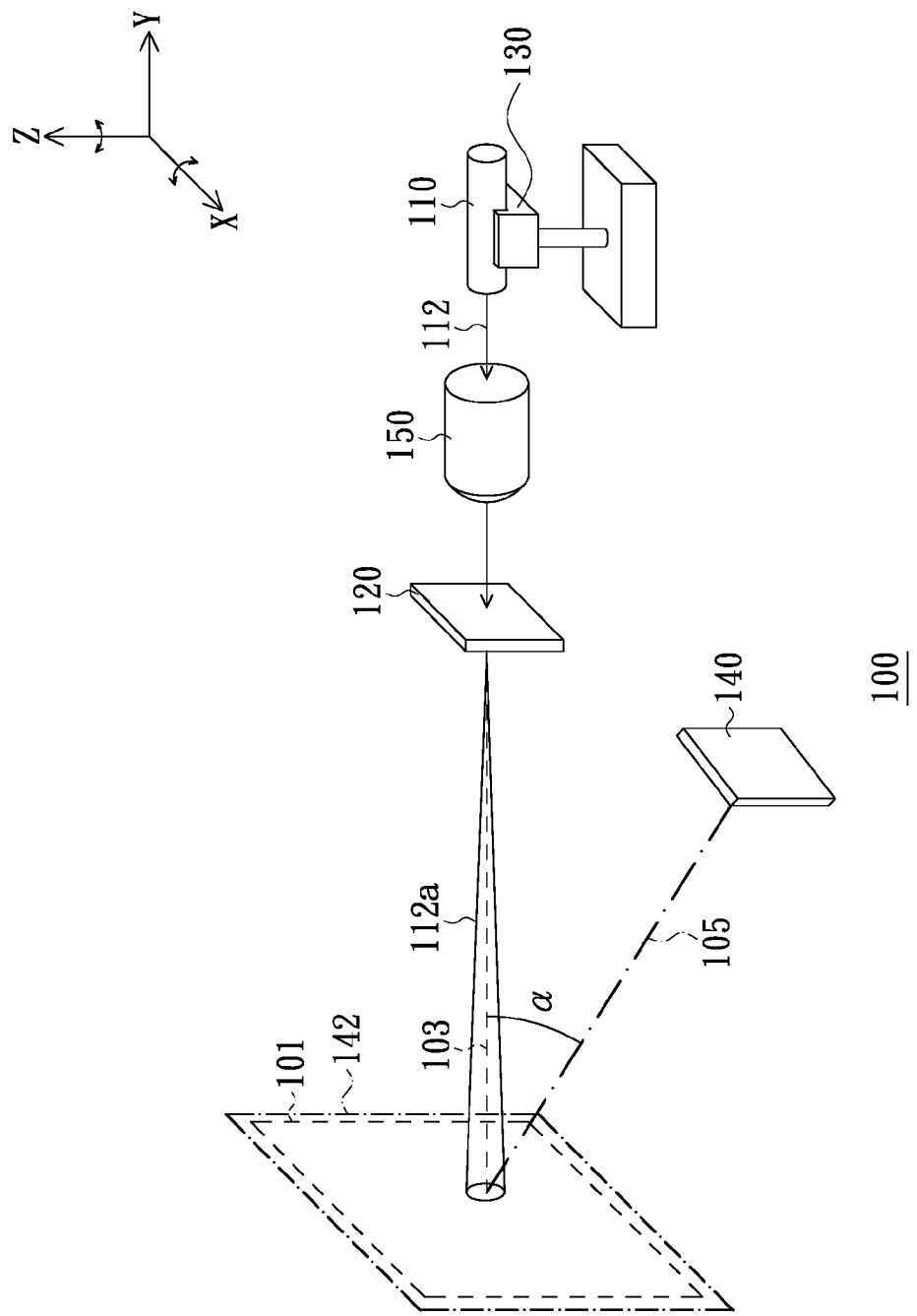
FIG. 1 is a schematic three dimensional view of a distance measuring device in accordance with an embodiment of the present invention.

FIG. 1 is a schematic three dimensional view of a distance measuring device in accordance with an embodiment of the present invention. Referring to FIG. 1, in the present embodiment, a distance measuring device 100 having a measuring range 101. The distance measuring device 100 is configured for measuring a distance of at least an object located in the measuring range 101. The distance measuring device 100 includes a light emitting component 110, a diffusing component 120, an adjusting component 130 and an image sensing component 140. The light emitting component 110 is configured for emitting a light beam 112. The diffusing component 120 is disposed on a transmission path of the light beam 112 and is configured for transforming the light beam 112 into a measuring light beam 112a with a specific pattern to irradiate the object. The adjusting component 130 is configured for adjusting an incidence angle and an incidence location of the light beam 112 striking at the diffusing component 120. The image sensing component 140 has a field of view 142 covering the measuring range 101.

The light emitting component 110 is a laser emitter, a light emitting diode (LED) or other suitable light emitting elements. The diffusing component 120 can be, but not limited to, a diffuser, a diffraction component or a light uniforming sheet. In addition, in the present embodiment, the adjusting component 130 includes a driving member (e.g., a motor or a MEMS device, etc.) The adjusting component 130 is connected to the light emitting component 110. The adjusting component 130 is configured for driving the light emitting component 110 to rotate around the X axis and the Z axis so as to adjust the incidence angle and the incidence location of the light beam 112 striking at the diffusing component 120, thereby changing an irradiating location of the measuring light beam 112a in the measuring range 101.

The image sensing component 140 can be, but not limited to, a charged coupled device (CCD) or complementary metal-oxide-semiconductor (CMOS) image sensor. In the present embodiment, the measuring light beam 112a has a first central axis 103, and the field of view 142 of the image sensing component 140 has a second central axis 105. An included angle α is formed between the first central axis 103 and the second central axis 105. The included angle α is, for example, less than 90 degrees. When the measuring light beam 112a irradiates the object, a speckle pattern will be formed on the surface of the object. The image sensing component 140 can sense the optical information of the measuring light beam 112a located in the measuring range 101, wherein the optical information can include the time that the measuring light beam 112a is sensed, the position of the measuring light beam 112a, the configuration of the measuring light beam 112a, the size of the measuring light beam 112a, the intensity of the measuring light beam 112a, or the phase of the measuring light beam 112a, etc. Thus, according to the optical information, the distance measuring device 100 can analyze to obtain the distance of the object. In addition, a focusing lens 150 can be disposed between the light emitting component 110 and the diffusing component 120.

Figure 2:
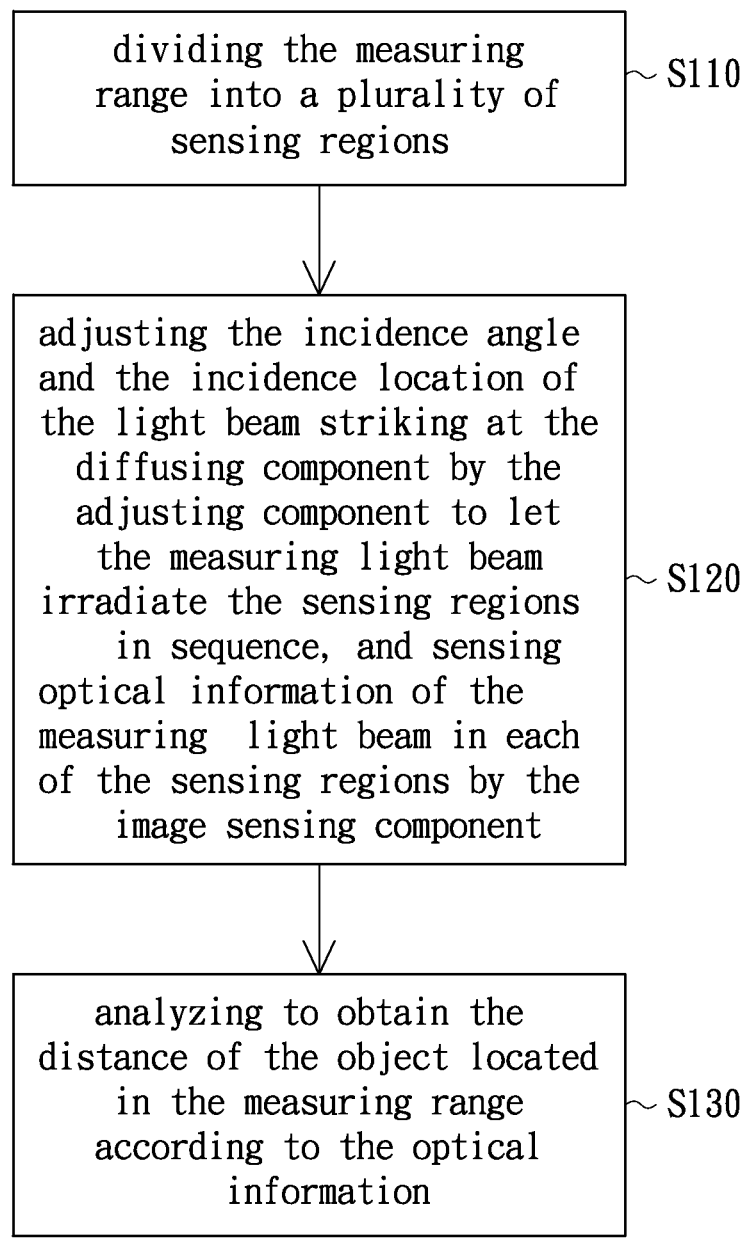
FIG. 2 is a flow chart of a method for measuring distance in accordance with an embodiment of the present invention.
Figure 3:
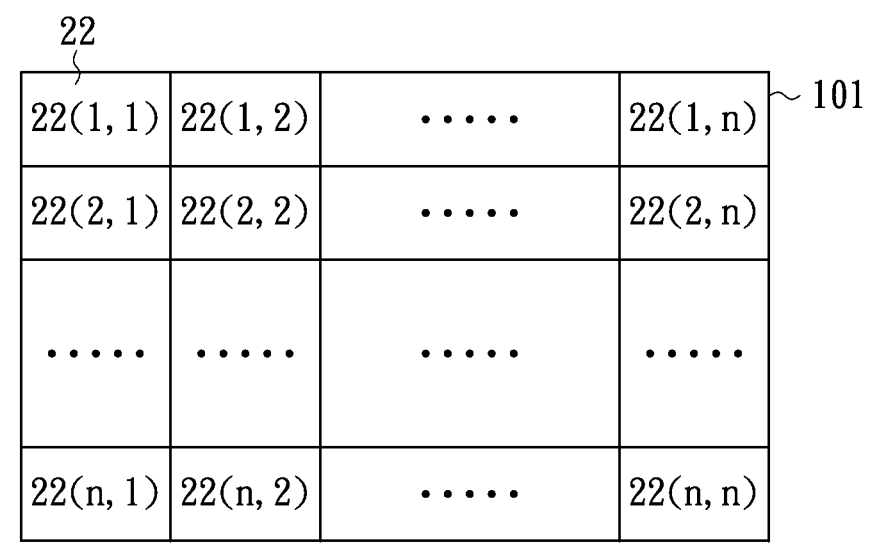

A method for measuring distance using the distance measuring device 100 will be described as follows. FIG. 2 is a flow chart of a method for measuring distance in accordance with an embodiment of the present invention. FIG. 3 is a schematic view of dividing the measuring range in accordance with an embodiment of the present invention. Referring to FIG. 1 to FIG. 3, in the present embodiment, the method for measuring distance includes the following steps. At first, as shown in step S110 and FIG. 3, the measuring range 101 is divided into a plurality of sensing regions 22. For example, the measuring range 101 is divided into n×n sensing regions 22 (i, j), wherein "n" is a positive integer, "i" is also a positive integer either less than or equal to "n", and "j" is also a positive integer either less than or equal to "n".

Next, as shown in step S120, the incidence angle and the incidence location of the light beam 112 striking at the diffusing component 120 are adjusted by the adjusting component 130 to let the measuring light beam 112a irradiate the sensing regions 22 in sequence, and the optical information of the measuring light beam 112a in each of the sensing regions 22 is sensed by the image sensing component 140. Then, the distance of the object located in the measuring range can be obtained according to the optical information. In detail, in the present embodiment, at first, the measuring light beam 112a irradiates the sensing regions 22 (1, j) (j=1, 2 . . . n) in a first row in sequence, and then the measuring light beam 112a irradiates the sensing regions 22 (2, j) (j=1, 2 . . . n) in a second row in sequence, and so forth, the measuring light beam 112a irradiates the sensing regions 22 (n, j) (j=1, 2 . . . n) in a n-th row in sequence. Thus, the entire measuring range 101 is irradiated by the measuring light beam 112a. When the measuring light beam 112a irradiates the sensing regions 22 of the measuring range 101 in sequence, the image sensing component 140 can sense the optical information of the measuring light beam 112a located in each of the sensing regions 22.

Next, as shown in step S130, the distance of the object located in the measuring range 101 can be obtained according to the optical information sensed by the image sensing component 140.

The steps S110 to the step S130 can be controlled by a control component (not shown) electrically connected to the light emitting component 110, the adjusting component 130 and the image sensing component 140. In addition, the control component can be configured for storing a lot of reference information. Thus, the distance of the object located in the measuring range 101 can be obtained by comparing the optical information sensed by the image sensing component 140 with the reference information. The reference information is, for example, the optical information sensed by the image sensing component 140 when the measuring light beam 112 irradiates an object with a known distance.

It is noted that, in FIG. 1, a plane surface where the measuring range 101 locates represents the farthest measurable distance of the distance measuring device 100. In other words, it is not necessary for the object to locate at the plane surface to be measured. For example, the measuring light beam 112a is predetermined to irradiate the sensing region 22(1, 1). Maybe, the measuring light beam 112a irradiates the object before the measuring light beam 112a arrives at the plane surface. As a result, the distance of the object can also be measured.

In the distance measuring device 100 and the method thereof, the measuring range 101 of the distance measuring device 100 is divided into the plurality of sensing regions 22. The incidence angle and the incidence location of the light beam 112 striking at the diffusing component 120 are adjusted by the adjusting component 130 to let the measuring light beam 112a irradiate the sensing regions 22 in sequence. Thus, the measuring light beam 112a is configured for irradiating a single small sensing region 22, thereby having a high energy. Thus, the distance measuring device 100 and the method thereof can increase the measurable distance on a condition that the power of the light emitting component 110 is not increased. In addition, because the distance measuring device 100 and the method thereof divide the measuring range 101 into the sensing regions 22 to measure, the distances of various parts of the object relative to the distance measuring device 100 can be measured, thereby obtaining a profile of the object. Also, because the distance measuring device 100 and the method thereof divide the measuring range 101 into the sensing regions 22 to measure, the distances of a number of objects located in the measuring range 101 can be measured.

In another embodiment of the present invention, the focusing lens 150 can be a zoom lens. A focusing location of the light beam 112 can be adjusted by changing a focal length of the focusing lens 150. Thus, the size of the speckle pattern formed by the measuring light beam 112a irradiating the object can be changed, thereby changing the measurable distance of the distance measuring device 100.

Figure 4:
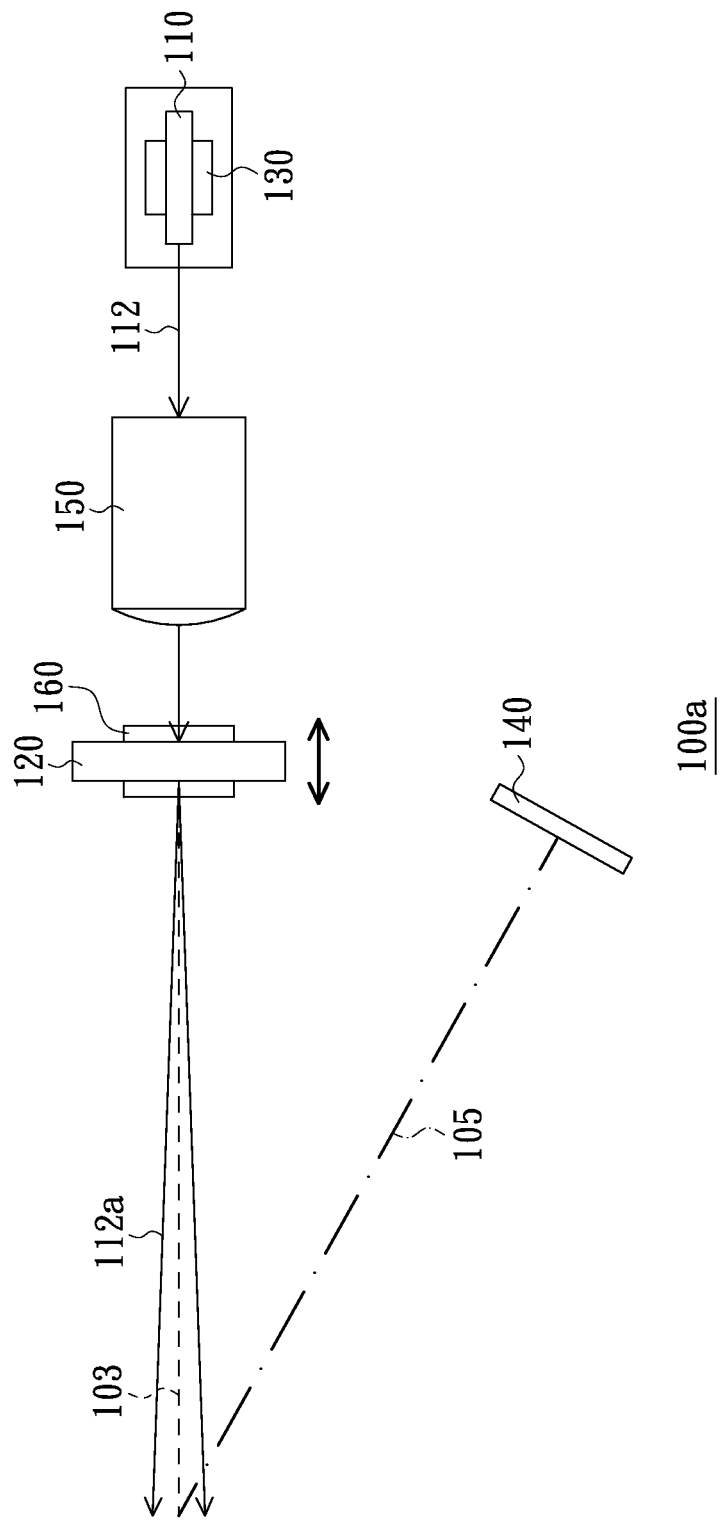
FIG. 4 is a schematic, top view of a distance measuring device in accordance with another embodiment of the present invention.

FIG. 4 is a schematic, top view of a distance measuring device in accordance with another embodiment of the present invention. Referring to FIG. 4, a distance measuring device 100a in the present embodiment is similar to the distance measuring device 100 except that the focusing lens 150 of the distance measuring device 100a is a fixed-focus lens and the distance measuring device 100a further includes a movable member 160 connected to the diffusing component 120. The movable member 160 is configured for driving the diffusing component 120 to move. In detail, the movable member 160 can move close to or far away the focusing lens 150, thereby driving the diffusing component 120 to move close to or far away the focusing lens 150 so as to change a distance between the diffusing component 120 and the focusing lens 150. Thus, the size of the speckle pattern formed by the measuring light beam 112a irradiating the object can be changed, thereby changing the measurable distance of the distance measuring device 100.

In another embodiment of the present invention, the focusing lens 150 can be a zoom lens. The distance between the diffusing component 120 and the focusing lens 150 is changeable. Thus, the measurable distance of the distance measuring device can be changed by changing the focal length of the focusing lens 150 and/or moving the diffusing component 120.

Figure 5:
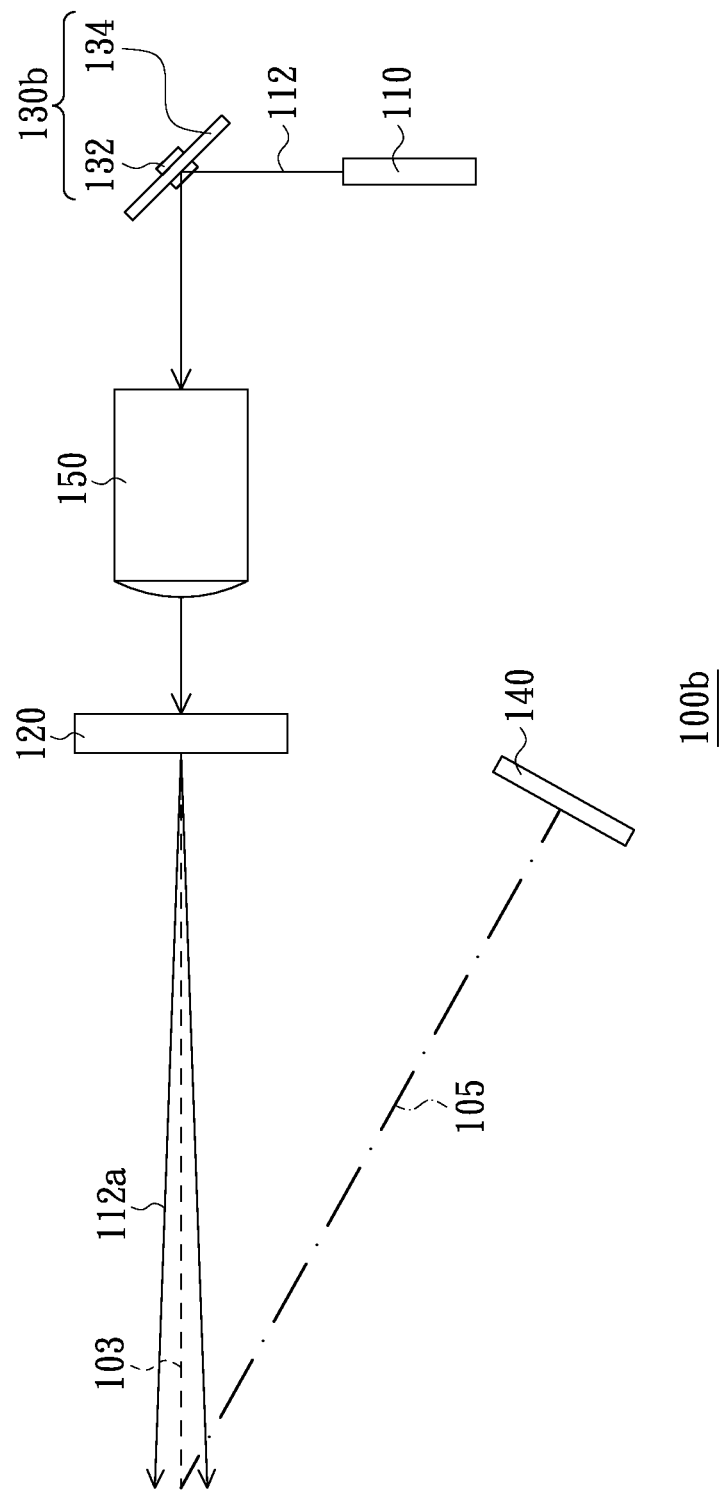
FIG. 5 is a schematic, top view of a distance measuring device in accordance with also another embodiment of the present invention.

FIG. 5 is a schematic, top view of a distance measuring device in accordance with also another embodiment of the present invention. Referring to FIG. 5, a distance measuring device 100b in the present embodiment is similar to the distance measuring device 100 except the adjusting component. In the present embodiment, the distance measuring device 100b includes a driving member 132 and a reflecting member 134. The reflecting member 134 is disposed between the diffusing component 120 and the light emitting component 110, and is configured for reflecting the light beam 112 to the diffusing component 120. The driving member 132 is connected to the reflecting member 134 so as to drive the reflecting member 134 to rotate, thereby changing the incidence angle and the incidence location of the light beam 112 striking at the diffusing component 120. Thus, the measuring light beam 112a can irradiate the measuring range divided into the plurality of sensing regions. The driving member 132 can be a motor, a MEMES device or other suitable driving members.

Figure 6:
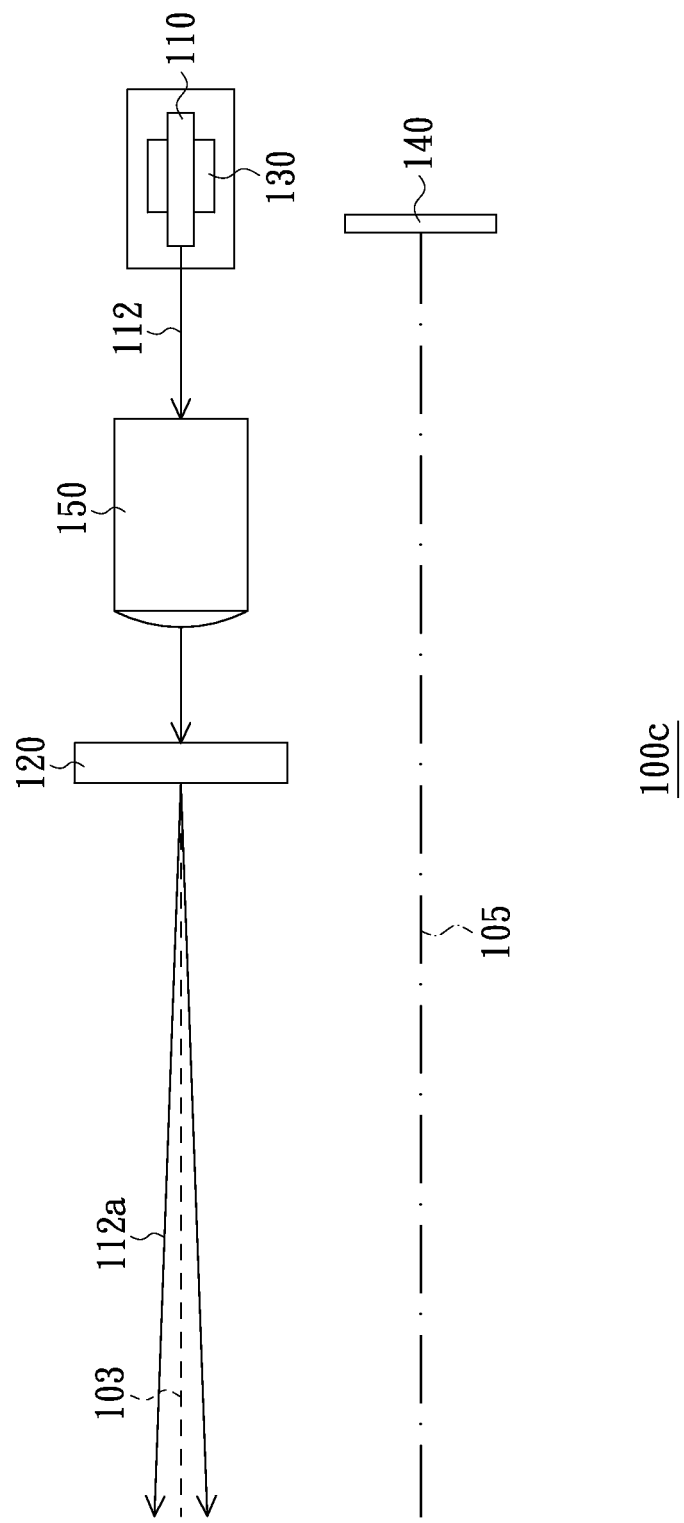
FIG. 6 is a schematic, top view of a distance measuring device in accordance with further another embodiment of the present invention.

FIG. 6 is a schematic, top view of a distance measuring device in accordance with further another embodiment of the present invention. Referring to FIG. 6, a distance measuring device 100c in the present embodiment is similar to the distance measuring device 100 except the location of the image sensing component 140. In the present embodiment, the first central axis 103 of the measuring light beam 112a is parallel to the second central axis 105 of the field of view 142 of the image sensing component 140.

Figure 7:
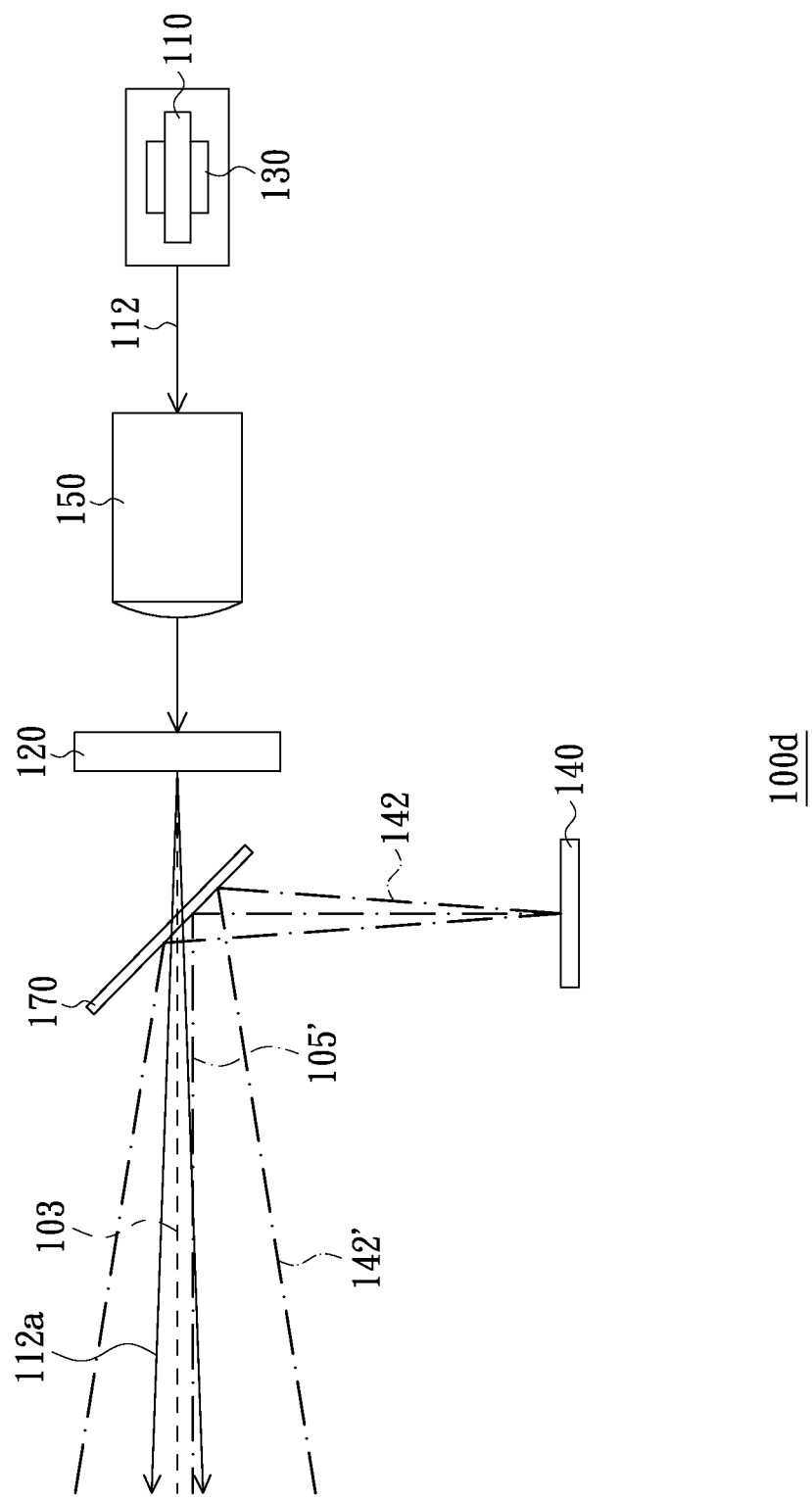
FIG. 7 is a schematic, top view of a distance measuring device in accordance with still another embodiment of the present invention.

FIG. 7 is a schematic, top view of a distance measuring device in accordance with still another embodiment of the present invention. Referring to FIG. 7, a distance measuring device 100d in the present embodiment is similar to the distance measuring device 100 except that the distance measuring device 100d further includes a beam splitter 170. The beam splitter 170 is disposed between the diffusing component 120 and the image sensing component 140. A portion of the light arriving at the beam splitter 170 penetrates the beam splitter 170 and a portion of the light arriving at the beam splitter 170 is reflected by the beam splitter 170. In the present embodiment, the measuring light beam 112a is formed by the portion of the light passing through the beam splitter 170. A field of view 142' refers to a portion of the field of view 142 of the image sensing component 140, which is turned by the beam splitter 170.

Due to the effect of the beam splitter 170, the field of view 142 of the image sensing component 140 is turned by the beam splitter 170. Label 142' represents the portion of the field of view 142 turned by the beam splitter 170. In the present embodiment, the first central axis 103 of the measuring light beam 112a is, for example, parallel to the second central axis 105' of the field of view 142'. In another embodiment, the first central axis 103 of the measuring light beam 112a and the second central axis 105' of the field of view 142' are, for example, overlapped.

The distance measuring device 100a, 100b, 100c and 100d have advantages similar to the distance measuring device 100 and are not described here.

Figure 8:
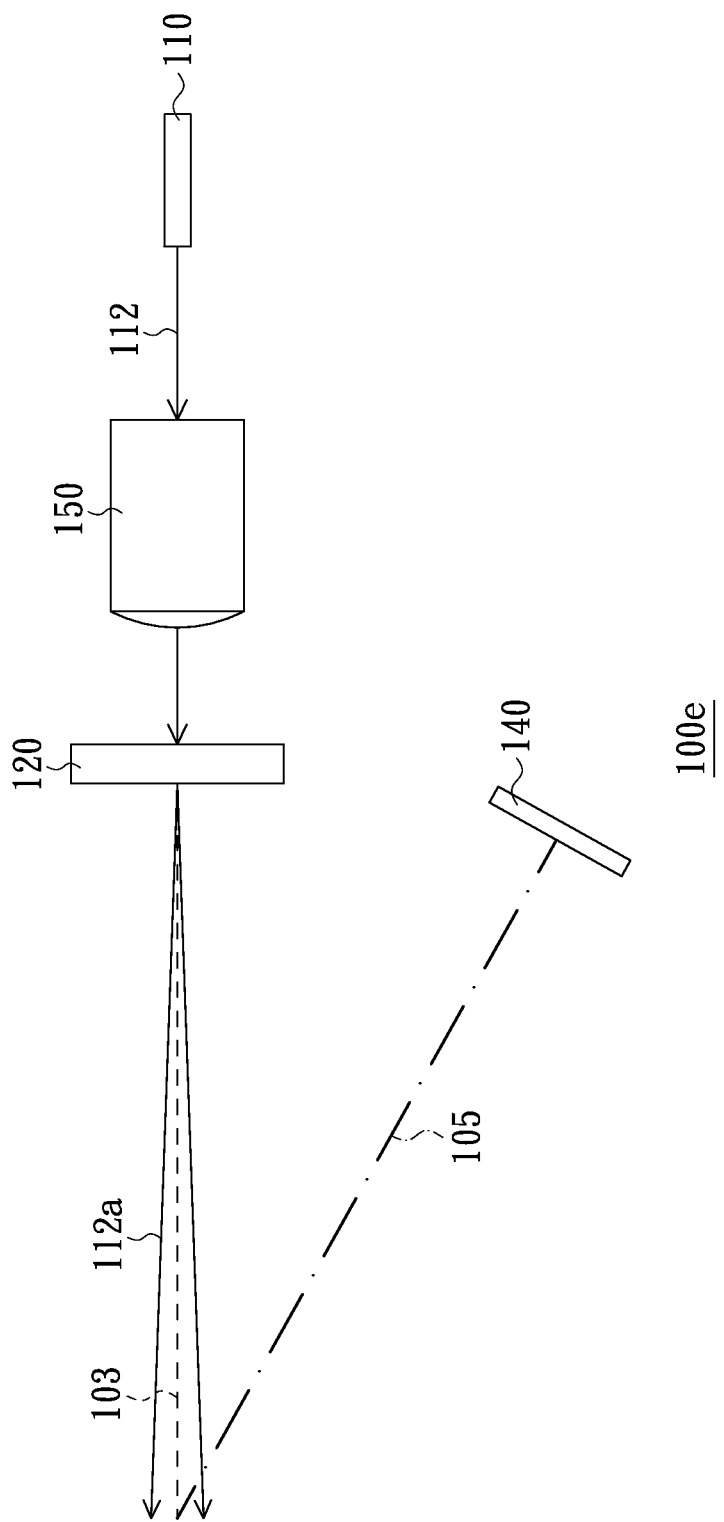
FIG. 8 is a schematic, top view of a distance measuring device in accordance with yet another embodiment of the present invention.

FIG. 8 is a schematic, top view of a distance measuring device in accordance with yet another embodiment of the present invention. Referring to FIG. 8, a distance measuring device 100e in the present embodiment is similar to the distance measuring device 100 except that the adjusting component 130 is omitted in the distance measuring device 100e and the focusing lens 150 of the distance measuring device 100e is a zoom lens. In other words, the distance measuring device 100e can not measuring the measuring range by dividing the measuring range into a plurality of sensing regions. However, the measurable distance of the distance measuring device 100e is adjustable and changeable.

Figure 9:
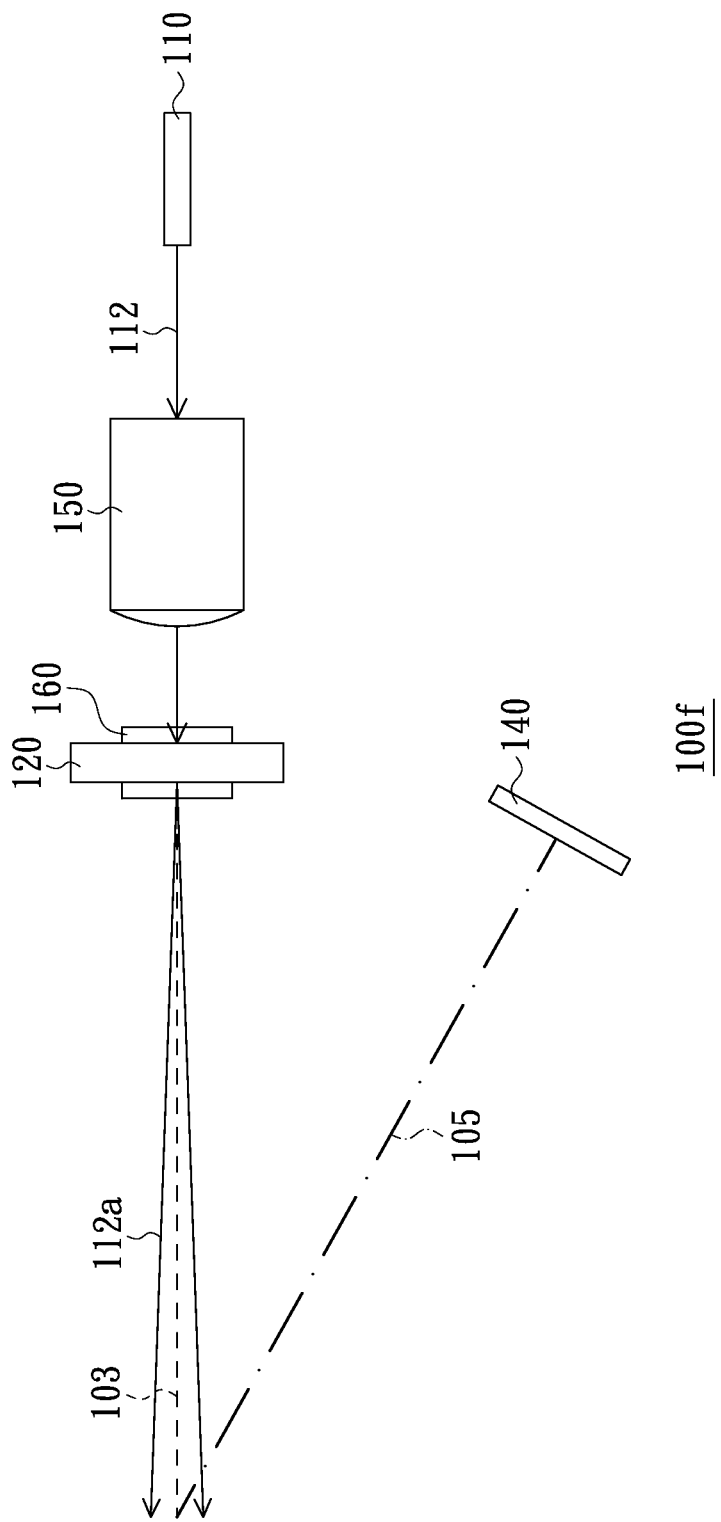
FIG. 9 is a schematic, top view of a distance measuring device in accordance with even another embodiment of the present invention.

FIG. 9 is a schematic, top view of a distance measuring device in accordance with even another embodiment of the present invention. Referring to FIG. 9, a distance measuring device 100f in the present embodiment is similar to the distance measuring device 100a except that the adjusting component 130 is omitted in the distance measuring device 100f. In other words, the distance measuring device 100e can not measuring the measuring range by dividing the measuring range into a plurality of sensing regions. However, the measurable distance of the distance measuring device 100f is adjustable and changeable. In another embodiment, the focusing lens 150 of the distance measuring device 100e is a zoom lens, and the distance between the focusing lens 150 and the diffusing component 120 is changeable. Thus, the measurable distance of the distance measuring device 100f can be changed by changing the focal length of the focusing lens 150 and/or moving the diffusing component 120.

In summary, the present invention has at least the following advantages:

1. In the distance measuring device and the method for measuring distance of the present invention, the measuring range of the distance measuring device is divided into the plurality of sensing regions, and the incidence angle and the incidence location of the light beam striking at the diffusing component are adjusted by the adjusting component to let the measuring light beam irradiate the sensing regions in sequence, thereby obtaining the distance of the object located in the measuring range. Thus, the measurable distance of the measuring distance can be increased on a condition that the power of the light emitting component is not increased.

2. In the distance measuring device of an embodiment of the present invention, because one of the focal length of the focusing lens and the distance between the diffusing component and the focusing lens is changeable, the measurable distance of the distance measuring device is adjustable and changeable, thereby satisfying the demand of changing the measurable distance.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A distance measuring device having a measuring range for measuring a distance of at least an object located in the measuring range, comprising:
   a light emitting component configured for emitting a light beam;
   a diffusing component disposed on a transmission path of the light beam, and the diffusing component being configured for transforming the light beam into a measuring light beam with a specific pattern to irradiate the object;
   an adjusting component configured for adjusting an incidence angle and an incidence location of the light beam striking at the diffusing component; and
   an image sensing component having a field of view, and the field of view covering the measuring range, wherein the image sensing component is configured for sensing an optical information of the specific pattern of the measuring light beam located in the measuring range so that the distance of the object could be calculated according to the optical information.

2. The distance measuring device as claimed in claim 1, wherein the adjusting component comprises a driving member, and the driving member is connected to the light emitting component to rotate the light emitting component.

3. The distance measuring device as claimed in claim 2, wherein the driving member comprises a motor or a micro-electro mechanical systems device.

4. The distance measuring device as claimed in claim 1, wherein the adjusting component comprises:
- a reflecting member disposed between the diffusing component and the light emitting component and configured for reflecting the light beam to the diffusing component; and
- a driving member connected to the reflecting member to rotate the reflecting member.

5. The distance measuring device as claimed in claim 4, wherein the driving member comprises a motor or a micro-electro mechanical systems device.

6. The distance measuring device as claimed in claim 1, further comprising a focusing lens disposed between the light emitting component and the diffusing component and on the transmission path of the light beam.

7. The distance measuring device as claimed in claim 6, wherein the focusing lens is a zoom lens.

8. The distance measuring device as claimed in claim 1, further comprising a movable member connected to the diffusing component and configured for moving the diffusing component.

9. The distance measuring device as claimed in claim 1, wherein the light emitting component is a laser emitter or a light emitting diode.

10. The distance measuring device as claimed in claim 1, wherein the diffusing component is selected from a group consisting of a diffuser, a diffraction component and a light uniforming sheet.

11. The distance measuring device as claimed in claim 1, wherein a first central axis of the measuring light beam is parallel to a second central axis of the field of view of the image sensing component.

12. The distance measuring device as claimed in claim 1, wherein an included angle is formed between a first central axis of the measuring light beam and a second central axis of the field of view of the image sensing component.

13. The distance measuring device as claimed in claim 1, further comprising a beam splitter disposed between the diffusing component and the image sensing component.

14. The distance measuring device as claimed in claim 13, wherein a first central axis of a portion of the measuring light beam passing through the beam splitter and a second central axis of the field of view of the image sensing component turned by the beam splitter are parallel or overlapped.

15. A method for measuring distance for the distance measuring device claimed in claim 1, comprising:
- dividing the measuring range into a plurality of sensing regions;
- adjusting the incidence angle and the incidence location of the light beam striking at the diffusing component by the adjusting component to let the measuring light beam with the specific pattern irradiate the sensing regions in sequence, and sensing optical information of the specific pattern of the measuring light beam in each of the sensing regions by the image sensing component; and
- analyzing to obtain the distance of the object located in the measuring range according to the optical information.

16. A distance measuring device having a measuring range for measuring a distance of at least an object located in the measuring range, comprising:
- a light emitting component configured for emitting a light beam;
- a diffusing component disposed on a transmission path of the light beam, and the diffusing component being configured for transforming the light beam into a measuring light beam with a specific pattern to irradiate the object;
- a focusing lens disposed between the light emitting component and the diffusing component and on the transmission path of the light beam, and at least one of a focal length of the focusing lens and a distance between the diffusing component and the focusing lens being changeable; and
- an image sensing component having a field of view, and the field of view covering the measuring range, wherein the image sensing component is configured for sensing an optical information of the specific pattern of the measuring light beam located in the measuring range so that the distance of the object could be calculated according to the optical information.

17. The distance measuring device as claimed in claim 16, wherein the focusing lens is a zoom lens.

18. The distance measuring device as claimed in claim 16, further comprising a movable member connected to the diffusing component and configured for moving the diffusing component.

19. The distance measuring device as claimed in claim 16, wherein the light emitting component is a laser emitter or a light emitting diode.

20. The distance measuring device as claimed in claim 16, wherein the diffusing component is selected from a group consisting of a diffuser, a diffraction component and a light uniforming sheet.

21. The distance measuring device as claimed in claim 16, wherein a first central axis of the measuring light beam is parallel to a second central axis of the field of view of the image sensing component.

22. The distance measuring device as claimed in claim 16, wherein an included angle is formed between a first central axis of the measuring light beam and a second central axis of the field of view of the image sensing component.

23. The distance measuring device as claimed in claim 16, further comprising a beam splitter disposed between the diffusing component and the image sensing component.

24. The distance measuring device as claimed in claim 23, wherein a first central axis of a portion of the measuring light beam passing through the beam splitter and a second central axis of the field of view of the image sensing component turned by the beam splitter are parallel or overlapped.

* * * * *